US011962130B2

(12) United States Patent
Guisasola

(10) Patent No.: US 11,962,130 B2
(45) Date of Patent: Apr. 16, 2024

(54) CONTACT SURFACE OF THE SPARK PLUG JACKET

(71) Applicant: Caterpillar Energy Solutions GmbH, Mannheim (DE)

(72) Inventor: Inigo Guisasola, Landau (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 18/268,286

(22) PCT Filed: Dec. 15, 2021

(86) PCT No.: PCT/EP2021/025506
§ 371 (c)(1),
(2) Date: Jun. 19, 2023

(87) PCT Pub. No.: WO2022/135738
PCT Pub. Date: Jun. 30, 2022

(65) Prior Publication Data

US 2024/0055836 A1 Feb. 15, 2024

(30) Foreign Application Priority Data

Dec. 22, 2020 (GB) ...................................... 2020379

(51) Int. Cl.
*H01T 13/08* (2006.01)

(52) U.S. Cl.
CPC .................................... *H01T 13/08* (2013.01)

(58) Field of Classification Search
CPC ...................................................... H01T 13/08
(Continued)

(56) References Cited

U.S. PATENT DOCUMENTS 2,870,760 A 1/1959 Michaud
3,157,164 A 11/1964 Woollatt et al.
(Continued)

FOREIGN PATENT DOCUMENTS

CN 112879145 A * 6/2021 .......... F02B 19/1009
EP 1508947 B1 9/2011
(Continued)

OTHER PUBLICATIONS

International Search Report related to Application No. PCT/EP2021/025506; dated Mar. 25, 2022.
(Continued)

*Primary Examiner* — Christopher M Raabe

(57) ABSTRACT

The present invention pertains to a spark plug jacket, e.g. for a large or high performance combustion engine, and a corresponding method of manufacturing a spark plug jacket, in particular to provide an improved sealing towards a coolant cavity. Accordingly, a spark plug jacket is suggested, comprising a contact surface for contacting a support surface of a cylinder head of a combustion engine, wherein in a first state, when a spark plug is not mounted in the spark plug jacket, at least a portion of the contact surface of the spark plug jacket defines a first angular offset to a contact surface direction defined by the support surface of the cylinder head and, in a second state, when the spark plug is mounted to the spark plug jacket, said portion defines a second angular offset, wherein the first angular offset is larger than the second angular offset.

17 Claims, 2 Drawing Sheets

(58) Field of Classification Search
USPC .......................................................... 313/11.5
See application file for complete search history.

(56) References Cited

U.S. PATENT DOCUMENTS

| | | | | |
|---|---|---|---|---|
| 6,474,285 | B2 | 11/2002 | Phillips | |
| 6,675,760 | B1 | 1/2004 | Gaehrken et al. | |
| 9,181,918 | B2 | 11/2015 | Abe | |
| 10,938,185 | B1 * | 3/2021 | Matulich | H01T 13/08 |

FOREIGN PATENT DOCUMENTS

| | | | | |
|---|---|---|---|---|
| FR | 2450520 | A1 | 9/1980 | |
| GB | 734063 | A | 7/1955 | |
| JP | 2018133186 | A | 8/2018 | |
| WO | WO-2022135736 | A1 * | 6/2022 | H01T 13/08 |
| WO | WO-2022135737 | A1 * | 6/2022 | H01T 13/08 |
| WO | WO-2022135739 | A1 * | 6/2022 | H01T 13/08 |

OTHER PUBLICATIONS

Great Britain Search Report related to Application No. 2020379.0; dated Mar. 9, 2021.

* cited by examiner

CONTACT SURFACE OF THE SPARK PLUG JACKET

CROSS-REFERENCE TO RELATED APPLICATION

This application is a 35 USC § 371 U.S. National Stage filing of International Application No. PCT/EP2021/025506 filed on Dec. 15, 2021 which claims priority under the Paris Convention to Great Britain Patent Application No. 2020379.0 filed on Dec. 22, 2020.

TECHNICAL FIELD

The present invention pertains to a spark plug jacket, e.g. for a large or high performance combustion engine, and a corresponding method of manufacturing a spark plug jacket, in particular to provide an improved sealing towards a coolant cavity.

TECHNOLOGICAL BACKGROUND

In combustion engines, cylinder heads are generally configured to receive a spark plug to facilitate ignition of a combustible mixture within a combustion chamber. The heat caused by operation of the spark plug and the corresponding combustion may result in a local increase of the temperature of the spark plug and surrounding components that may be detrimental, such that the temperature needs to be kept within a predefined range and is accordingly cooled. Such cooling is provided by a coolant, which may e.g. be circulated in a coolant circuit and which resides in one or more cavities adjacent to the spark plug.

A direct contact between the coolant and the spark plug would require that the coolant is discharged or renewed upon every spark plug renewal or overhaul. In order to avoid such discharge, which may be laborious and costly and may require waiting times to handle the coolant within an acceptable temperature range, a spark plug jacket is provided in the cylinder head which is configured to be screwed into a corresponding thread of the cylinder head and furthermore comprises a thread to receive a spark plug within the spark plug jacket. Accordingly, the spark plug jacket may seal the coolant cavity and remains in place upon spark plug replacement, thereby facilitates such replacement.

However, as the mounting of the spark plug into the spark plug jacket occurs after the mounting of the spark plug jacket into the cylinder head, this may cause a reduction in the pressure or bolt force between the spark plug jacket and the cylinder head. Due to the limited available clamping length, such reduction in the pressure or bolt force may result in leakage towards the coolant cavity, such that combustion gases may penetrate the coolant via the spark plug jacket.

Accordingly, there is a need to improve the sealing of the spark plug jacket towards the cylinder head and to at least partially abrogate the above unfavorable conditions.

SUMMARY OF THE INVENTION

Starting from the prior art, it is an objective to provide a new and inventive spark plug jacket for a combustion engine. In particular, it may be an objective to improve the sealing characteristics of the spark plug jacket and/or to prevent leakage, even after replacing the spark plug.

This objective is solved by means of the spark plug with the features of claim 1 and the method of manufacturing a spark plug with the features of claim 10. Preferred embodiments are set forth in the present specification, the Figures as well as the dependent claims.

Accordingly, a spark plug jacket is suggested, comprising a contact surface for contacting a support surface of a cylinder head of a combustion engine, wherein in a first state, when a spark plug is not mounted in the spark plug jacket, at least a portion of the contact surface of the spark plug jacket defines a first angular offset to a contact surface direction defined by the support surface of the cylinder head. In a second state, when the spark plug is mounted to the spark plug jacket, said portion defines a second angular offset, wherein the first angular offset is larger than the second angular offset.

Furthermore, a method for manufacturing a spark plug jacket is suggested, comprising the steps of:

- providing a spark plug jacket defining a longitudinal direction;
- screwing a biasing element into a thread of the spark plug jacket configured for accommodating a thread of a spark plug; and
- modifying, in the mounted state of the biasing element, at least a portion of a contact surface of the spark plug jacket for contacting a support surface of a cylinder head of a combustion engine.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
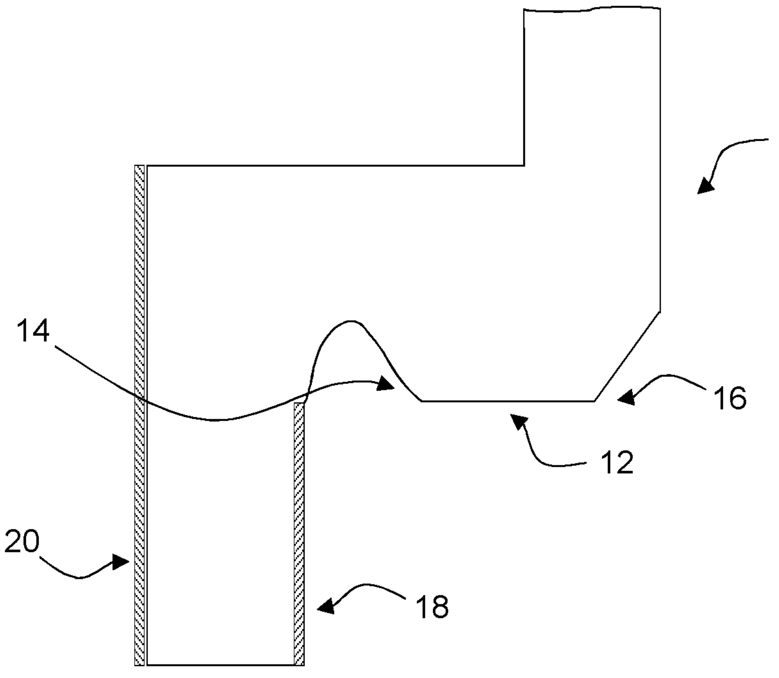
FIG. 1 shows a longitudinal section of a lower region of a spark plug jacket in an unmounted state and in a state wherein a spark plug is not mounted.

In the following, the invention will be explained in more detail with reference to the accompanying figures. In the Figures, like elements are denoted by identical reference numerals and repeated description thereof may be omitted in order to avoid redundancies.

In FIG. 1 a longitudinal section of the lower region of a spark plug jacket 10 is schematically depicted in an unmounted state and in a state wherein a spark plug is not mounted. The region corresponds to a region of the spark plug jacket 10 facing a combustion area of a cylinder head in the mounted state in a cylinder head. The spark plug jacket 10 comprises a contact surface 12 for contacting a support surface of a cylinder head of a combustion engine. The contact surface 12 extends from an inner diameter 14 to an outer diameter 16 defined by the contact surface, wherein an optional curvature is provided at the inner diameter 14 connecting an end section of the spark plug jacket 10 extending in a longitudinal direction. At the outer diameter 16 a bevel or chamfer is provided, which connects the contact surface 12 with an upper portion of the spark plug jacket 10 extending away from the end facing a combustion area. An outer thread 18 is provided for mounting the spark plug jacket into a cylinder head and an inner thread 20 is provided for a screwing engagement with a spark plug.

The contact surface 12 is depicted as an essentially flat and/or planar surface that extends in a radial direction, i.e. perpendicular to the longitudinal axis of the spark plug jacket 10. Upon mounting the spark plug jacket 10, in the original, non-modified state, the entire contact surface 12 would be brought into contact with a support surface of the cylinder head. After mounting of the spark plug jacket 10, mounting of a spark plug therein may provide that an undesirable deformation of the spark plug jacket 10 is provided, which may impair the mounting of the spark plug and may furthermore result in an undesirable pressure distribution between the spark plug jacket 10 and the cylinder head, potentially resulting in a leakage between the spark plug jacket 10 and the cylinder head.

Figure 2:
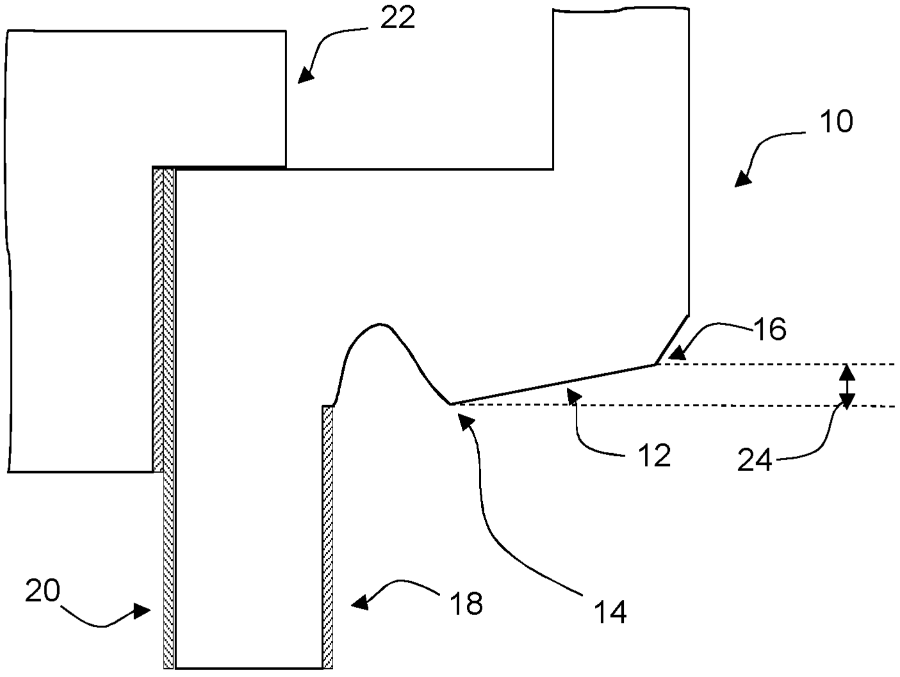
FIG. 2 shows the spark plug jacket according to FIG. 1 with a mounted biasing element.

In order to improve the pressure distribution and avoid such leakage, a biasing element 22 is mounted into the spark plug jacket 10 and engages the inner thread 20 thereof, as depicted in FIG. 2. In this mounted state of the biasing element 22, the contact surface 12 is deformed and a portion of the contact surface 12 at the inner diameter 14 protrudes in the longitudinal direction towards the bottom end of the spark plug jacket 10. Accordingly, a longitudinal offset 24 is provided between the inner diameter 14 and the outer diameter 16, as indicated by the dashed lines and the corresponding double arrow.

The biasing element 22 is formed as a dummy spark plug, which may not have the corresponding functionalities of a spark plug, but may have essentially the same shape and dimensioning and may e.g. be formed of a solid material, e.g. steel, so as to withstand larger torques without impairing the structural integrity of the dummy spark plug. According to the present non-limiting embodiment, a mounting torque of about 200 Nm has been applied to the dummy spark plug. Accordingly, the protrusion of the contact surface 12 in the longitudinal direction at the inner diameter 14 may not entirely correspond to a protrusion obtained when mounting a commonly used spark plug, which may be mounted with e.g. 30 Nm to 50 Nm. However, the additional torque and corresponding longitudinal offset 24 may be advantageous for the modification, since it may be ensured that such state may be effectively avoided by means of modifying the contact surface 12, as shown in FIGS. 3 and 4.

Figure 3:
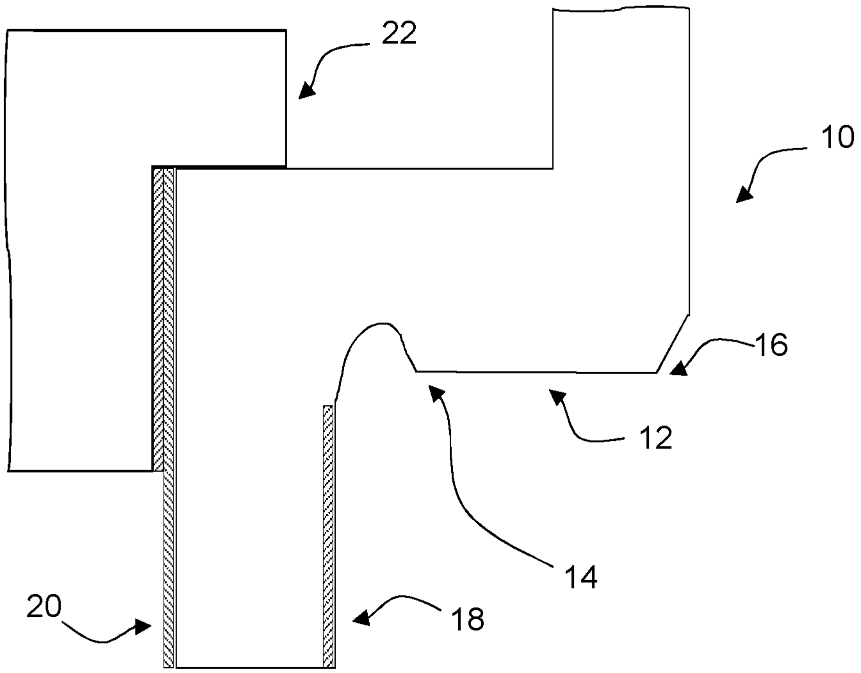
FIG. 3 shows the spark plug jacket according to FIG. 2 after modifying the contact surface in the mounted state of the biasing element.
Figure 4:
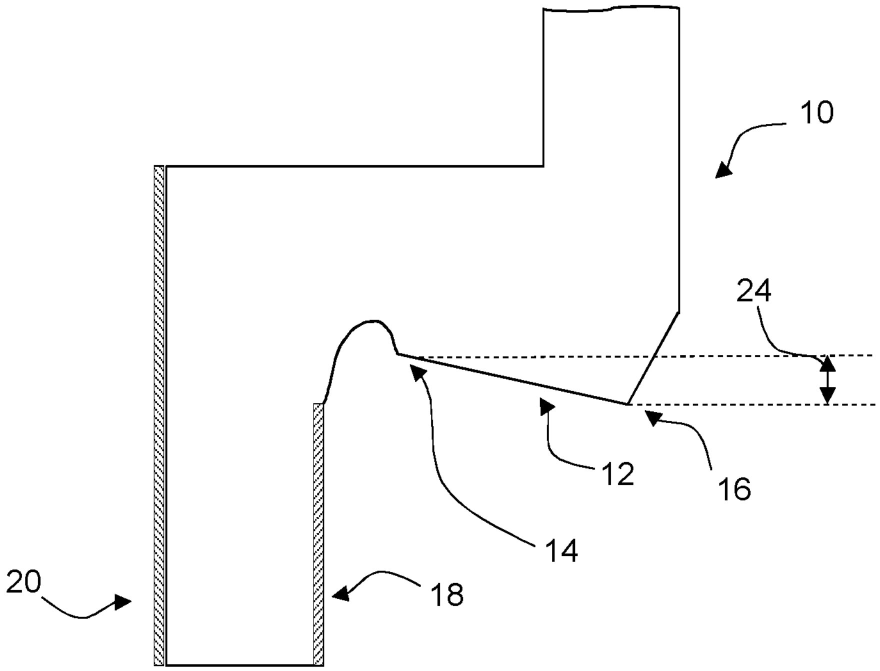
FIG. 4 shows the spark plug jacket according to FIG. 3 after removal of the biasing element.

Accordingly, as shown in FIG. 3, material has been removed, i.e. the material of the protruding portion has been removed in the mounted state of the biasing element 22. Thereby, the contact surface 12 has been flattened and extends in an essentially radial direction from the inner diameter 14 to the outer diameter 16. By providing such flattening, it may be ensured that an optimal contacting interface may be provided between the spark plug jacket 10 and the cylinder head without impairing the mounting of the spark plug jacket 10 and the mounting of the spark plug and with improved pressure distribution.

Furthermore, if applying lower torques during the mounting of the spark plug compared with the mounting torque for the biasing element 22, an angular offset may be provided with regard to the radial direction and/or the support surface of the cylinder head in the mounted state of the spark plug jacket That is, an (a slight) inclination of the contact surface 12 may be provided in a radially inward direction starting from the outer diameter 16 or a point radially inward from the outer diameter 16 while maintaining contact between a portion of the contact surface 12 at the outer diameter 16 and the support surface of the cylinder head.

In addition, the modification of the contact surface 12, i.e. the removal of material from a portion of the contact surface 12, provides that in the unmounted or relaxed state of the spark plug jacket 10, i.e. wherein no spark plug is mounted in the spark plug jacket 10, an angular offset of the contact surface 12 is provided with regard to the radial direction or extension of the spark plug jacket 10 and/or an extending direction of a support surface of the cylinder head (i.e. as seen in the intended mounted state). As shown, the modification of the contact surface 12 under pressure, i.e. with a mounted biasing element, may hence provide a contact surface 12 which is formed as an essentially (asymmetrical) conical shape, wherein an apex is essentially pointed in a downward longitudinal direction, which may correspond to a position of the support surface of the cylinder head in the mounted state.

The conical shape is furthermore radially offset towards the outer diameter 16. A circumferential line contact at this end may be particularly advantageous to provide a more flexible connection and to provide a more advantageous pressure distribution. Upon mounting the spark plug and applying a corresponding mounting torque, the contact surface 12 may partly deform again towards the state depicted in FIG. 3. Thereby, the angular offset provided in the state, where no spark plug is mounted in the spark plug jacket 10, may be reduced again upon mounting the spark plug, such that the contact interface may be enlarged in a radially inward direction according to the applied mounting torque.

The longitudinal offset 24 for the modified spark plug jacket 10 according to FIG. 4 may advantageously correspond to the longitudinal offset in the biased unmodified spark plug jacket 10 according to FIG. 2. When subsequently mounting the spark plug into the spark plug jacket 10, the longitudinal offset 10 may be reduced again corresponding to the reduced angular offset and the applied mounting torque.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A spark plug jacket is provided.

Such spark plug jacket may comprise a contact surface for contacting a support surface of a cylinder head of a combustion engine, wherein in a first state, when a spark plug is not mounted in the spark plug jacket, at least a portion of the contact surface of the spark plug jacket defines a first angular offset to a contact surface direction defined by the support surface of the cylinder head and, in a second state, when the spark plug is mounted to the spark plug jacket, said portion defines a second angular offset, wherein the first angular offset is larger than the second angular offset.

The larger angular offset in the unmounted state of the spark plug has the advantage that the contact surface may contact a predefined region of the support surface of the cylinder head prior to application of a mounting torque of a spark plug accommodated within the spark plug jacket. For example, an initial (circumferential) line contact may be provided, which may extend, i.e. be enlarged in the direction of a main contact surface direction defined by the support surface of the cylinder head upon applying a predefined mounting torque.

In other words, the contacting area or contacting interface between the spark plug jacket and the cylinder head may be enlarged upon mounting the spark plug into the spark plug jacket, such that an initial longitudinal distance or angle between the contact surface and the support surface is gradually reduced upon application of the predefined torque. Thereby, a more flexible connection is provided, which may be advantageous for the distribution of the pressure between the spark plug jacket and the cylinder head. In particular, a loss in bolt load and/or pressure, which may e.g. be caused due to flattening of the surface roughness and/or by temperature deformations during the mounting of the spark plug jacket, may be effectively counteracted and leakage between the spark plug jacket and the cylinder head may hence be prevented.

By providing such flexible connection, insertion and mounting of the spark plug jacket may furthermore be facilitated, since a gradually increasing contacting interface may be provided between the (contact surface of the) spark plug jacket and the cylinder head rather than an essentially fixed and parallel contacting interface prior to and after applying the predefined mounting torque. In other words, the flexible connection provides that the contact surface may be more adaptable to the support surface during mounting of the spark plug jacket. Accordingly, an improved mounting of the spark plug jacket and corresponding bolt force may be provided so as to effectively prevent leakage between the spark plug jacket and the cylinder head. Such bolt force may be even further increased when mounting a spark plug in the spark plug jacket after mounting the spark plug jacket into the cylinder head since this further improves the connection between the spark plug jacket and the cylinder head via the accordingly modified angular offset of the contact surface of the spark plug jacket.

The contact surface and, in particular, the first and/or second angular offset may be adapted to the application, i.e. the intended support surface of the cylinder head. Accordingly, the contact surface of the spark plug jacket may be configured according to a variety of first and second angular offsets. The radial direction of the spark plug jacket, e.g. for an axial symmetrical spark plug jacket, may essentially correspond to a direction defined by the support surface of the cylinder head, such that the first and second angular offsets may correspond to respective offsets to a radial direction of the spark plug jacket. However, the geometry and dimensioning of the support surface of the cylinder head may vary between different types of cylinder heads, such that the radial direction and the main direction defined by the support surface may not necessarily correspond.

Preferably, a radial extension of the spark plug jacket essentially corresponds to a main lateral direction of the cylinder head or main extension direction of the support surface of the cylinder head. In this manner, the first and second angular offsets may correspond to respective offsets with regard to the radial extension of the spark plug jacket, i.e. both in the unmounted and in the mounted state of a spark plug in the spark plug jacket.

In order to provide a (further) gradual increase of a contacting interface and hence a more homogeneous pressure distribution during the application of the mounting torque of the spark plug, essentially the entire contact surface may comprise an angular offset to a radial direction of the spark plug jacket in the unmounted state. Accordingly, the contact surface may comprise e.g. one or more angular offsets for different portions so as to form a predefined geometrical shape and or one or more edges.

Preferably, the angular offset of the entire contact surface is continuous and corresponds to the first angular offset for the entire contact surface. Hence, the contact surface may be provided by an essentially straight surface, which may be tilted or be at an angle with regard to the support surface of the cylinder head and/or the radial direction of the spark plug jacket, i.e. forming (imaginary) intersecting lines therewith. The continuous angular offset may be further advantageous in view of the pressure distribution during application of a mounting torque for the spark plug and to provide a further improved flexibility of the connection, preferably also when mounting the spark plug jacket.

The portion of the contact surface may define an outer diameter and an inner diameter, wherein the contact surface comprises a longitudinal offset between the inner diameter and the outer diameter. Preferably, the entire contact surface defines or extends between the inner diameter and outer diameter. The longitudinal offset may hence provide that the longitudinal extension of the contact surface is such that e.g. an end of the contact surface at the outer diameter is closer to an end of spark plug jacket being adjacent to a combustion area of the cylinder head in the mounted state of the spark plug jacket.

Although the configuration may also reversed, i.e. having an end of the contact surface at the inner diameter being closer to the combustion area in the mounted state of the spark plug jacket, the longitudinal extension at the outer diameter has the advantage that, depending on the configuration of the cylinder head and the support surface thereof, an initial contacting interface between the spark plug jacket and the cylinder head may be provided at the outer diameter, thereby providing an improved flexibility of the connection that is advantageous for the (subsequent) pressure distribution.

Preferably, the longitudinal offset is between 1 and 30 micrometer, preferably between 5 and 15 micrometer, in particular between 8 and 12 micrometer. The offset may e.g. be chosen to achieve a predefined line pressure, which may be advantageously provided by the first angular offset. It has been found that a longitudinal offset between 8 and 12 micrometer is particularly advantageous in order to provide a sufficient line pressure without potentially adversely affecting the sealing function.

To further facilitate such line pressure, the portion of the contact surface preferably comprises a conical shape, preferably in the longitudinal direction defined by the spark plug jacket.

The portion of the contact surface having the first angular offset may e.g. form one lateral extension or “leg” of the conical shape, while an end of said portion may comprise a bevel or chamfer forming a second, adjacent lateral extension or “leg, such that an edge is formed which may provide an initial contact with the support surface of the cylinder head.

Furthermore, the conical shape is preferably asymmetric, in particular in the radial direction of the spark plug jacket. The conical shape may be configured to face the combustion area of the cylinder head in the mounted state of the spark plug jacket.

For example, the entire contact surface may extend from an inner diameter towards an outer diameter defined by the contact surface and may comprise a bevel or chamfer at the end of the contact surface at the outer diameter. The contact surface preferably comprises a larger extension in the radial direction compared with the extension of the bevel or chamfer in the radial direction so as to form an asymmetric conical shape, wherein a tip or apex of the cone shape is offset towards the outer diameter and toward the end of the spark plug jacket facing the combustion area in the mounted state of the spark plug jacket. The bevel or chamfer may furthermore comprise a longitudinal offset with an outer wall of the spark plug jacket which may correspond to a longitudinal offset between the inner diameter and the outer diameter of the contact surface.

Although the apex of the conical shape may advantageously be oriented in parallel to a symmetry axis of the spark plug jacket, said apex may also be provided at an angle therewith, which may be advantageous for particular embodiments of the cylinder head and corresponding support surface and which may e.g. depend on the respective application of the spark plug jacket.

Furthermore, a method of manufacturing a spark plug jacket is provided.

Such method may comprise the steps of:

providing a spark plug jacket defining a longitudinal direction;

screwing a biasing element into a thread of the spark plug jacket configured for accommodating a thread of a spark plug; and modifying, in the mounted state of the biasing element, at least a portion of a contact surface of the spark plug jacket for contacting a support surface of a cylinder head of a combustion engine.

By mounting the biasing element in the spark plug jacket, the configuration of the contact surface may be changed in a biased state of the spark plug jacket. This may significantly facilitate the modification of the portion of the contact surface by enabling to directly modify a portion of the contact surface or remove an excess portion of the contact surface in the biased state. In particular, modifications in a particular range, e.g. in the range of 5 to 50 micrometer, may be performed significantly faster in this manner, potentially manually, compared with e.g. computer-numerically-controlled modifications, which may require considerable time to achieve a predefined accuracy level.

By means of the modification in the biased state of the spark plug jacket, the contact surface may be furthermore adapted to a desired state in a state wherein a spark plug jacket receives and accommodates a corresponding element. For example, the biased state may resemble a state and/or shape of the spark plug jacket in the mounted state in a cylinder head and having a spark plug mounted therein. Accordingly, an ideal state of the contact surface may be directly obtained by appropriate modification of at least a portion of the contact surface in the biased state.

For example, the biasing element may be mounted with a mounting torque of at least 30 Nm or at least 50 Nm, which may correspond to mounting torques of commonly used spark plugs. However, the biasing element is preferably mounted with a predefined mounting torque, which may not be compatible with commonly used spark plugs, e.g. of at least 100 Nm or between 150 Nm and 250 Nm, e.g. about 200 Nm This may ensure that the optimal state is not fully achieved when subsequently removing the biasing element, mounting the spark plug jacket in the cylinder head and mounting a spark plug in the spark plug jacket. In other words, this may provide a predefined tolerance or clearance and ensures that the application of the mounting torque and full fixation of the spark plug is facilitated, i.e. is not counteracted by increased torque resistance due to the shape of the contact surface.

In order to enable the application of larger torques of e.g. 100 Nm or 200 Nm, the biasing element may be formed as a dummy spark plug, which may not have the corresponding functionalities, but may have essentially the same shape and dimensioning and may e.g. be formed of a solid material so as to withstand larger torques without impairing the structural integrity of the dummy spark plug.

Preferably, the modification step comprises material removal of a portion of the contact surface so as to flatten the contact surface in the mounted state of the biasing element, preferably obtaining an essentially planar portion extending in an essentially radial direction in the mounted state of the biasing element.

Furthermore, the portion of the contact surface from which material is removed preferably corresponds to a portion of the contact surface having an angular offset to a radial direction of the spark plug jacket and/or extending in the longitudinal direction in the mounted state of the biasing element. In other words, a portion of the contact surface may be removed, which protrudes from a radial and/or planar surface in the longitudinal direction.

Thereby, a particular predefined shape of the spark plug jacket may be achieved upon subsequent removal of the biasing element. For example, such particular removal or flattening of the portion of the contact surface may provide that the portion of the contact surface or the entire contact surface may comprise an angular offset to a radial direction of the spark plug jacket in the unmounted state of the biasing element. The angular offset may be essentially continuous from an inner diameter towards an outer diameter defined by the contact surface, wherein a bevel or chamfer may be provided e.g. at an end of the contact surface at the outer diameter thereof. A longitudinal offset may be provided between the inner diameter and the outer diameter, so as to form an essentially conical shape, which may be offset in the radial direction towards the outer diameter and may comprise an apex facing an end of the spark plug jacket adjacent the combustion area in the mounted state of the spark plug jacket in a cylinder head.

Accordingly, the method may provide that a circumferential apex or edge may be provided at the outer diameter of the contact surface. As described above, this may be particularly advantageous to provide a circumferential line contact with a support surface of a cylinder head at the outer diameter of the support surface and the contact surface upon mounting of the spark plug jacket into the cylinder head, i.e. to provide a more flexible connection.

The modification step may comprise material removal of the portion by machining under stress or milling.

Alternatively, the modification step may comprise material removal of the portion by plunge turning. Preferably, the material removal is provided by compression, preferably using an entire width of a cutting-edge. This may provide a more homogenous modification. More preferably, a predefined compression force may be applied, preferably continuously, wherein the compression force is preferably monitored and/or controlled to avoid brinelling or chatter marks.

A variety of spark plug jackets may be manufactured according to the above described method. Preferably, the method for manufacturing a spark plug jacket may be performed to manufacture a spark plug jacket according to the invention. Accordingly, corresponding features and technical advantages described in view of the spark plug jacket equally apply to the method according to the invention and vice versa, where applicable, and it is hence referred to the above to avoid redundancy.

Although the term "screwing" is used in the above, it will be understood that a more general fastening may be used where applicable, e.g. to secure or mount the biasing element in the spark plug jacket. Preferably, the term screwing indicates a turning or rotational movement to provide a longitudinal displacement, e.g. by applying a torque.

INDUSTRIAL APPLICABILITY

With reference to the Figures, a spark plug jacket for a cylinder head of a combustion engine as well as a method of manufacturing a spark plug jacket are suggested. The suggested spark plug jacket as mentioned above is applicable in a variety of engines, such as (large) gas engines, which require an ignition system and cooling thereof and wherein replacement of spark plugs may be necessary. The spark plug jacket and corresponding contact surface improves the bolt force of the spark plug jacket so as to avoid leakage of combustion gases into the coolant cavity, even after repeated spark plug replacements. Further, the spark plug jacket may be applied as part of a replacement or retrofitting, wherein a spark plug jacket may be exchanged e.g. upon overhaul, or prior to use and operation of the engine.

The invention claimed is:

1. A spark plug jacket comprising a contact surface for contacting a support surface of a cylinder head of a combustion engine, wherein in a first state, when a spark plug is not mounted in the spark plug jacket, at least a portion of the contact surface of the spark plug jacket defines a first angular offset to a contact surface direction defined by the support surface of the cylinder head and, in a second state, when the spark plug is mounted to the spark plug jacket, said portion defines a second angular offset, wherein the first angular offset is larger than the second angular offset.

2. The spark plug jacket according to claim 1, wherein essentially the entire contact surface has an angular offset to a radial direction of the spark plug jacket in the unmounted state.

3. The spark plug jacket according to claim 2, wherein the angular offset is continuous and corresponds to the first angular offset for the entire contact surface.

4. The spark plug jacket according to claim 1, wherein the portion of the contact surface defines an outer diameter and an inner diameter and wherein the contact surface comprises a longitudinal offset between the inner diameter and the outer diameter.

5. The spark plug jacket according to claim 4, wherein said longitudinal offset is between 1 and 30 micrometer, preferably between 5 and 15 micrometer, in particular between 8 and 12 micrometer.

6. The spark plug jacket according to claim 1, wherein the portion comprises a conical shape, preferably in the longitudinal direction defined by the spark plug jacket.

7. The spark plug jacket according to claim 6, wherein the conical shape is asymmetric, preferably in the radial direction of the spark plug jacket.

8. The spark plug jacket according to claim 6, wherein the conical shape is configured to face the combustion area of the cylinder head in the mounted state of the spark plug jacket.

9. The spark plug jacket according to claim 1, wherein a radial extension of the spark plug jacket essentially corresponds to a main lateral direction of the cylinder head.

10. A method of manufacturing a spark plug jacket, comprising the steps of:

providing a spark plug jacket defining a longitudinal direction;

screwing a biasing element into a thread of the spark plug jacket configured for accommodating a thread of a spark plug; and modifying, in the mounted state of the biasing element, at least a portion of a contact surface of the spark plug jacket for contacting a support surface of a cylinder head of a combustion engine.

11. The method according to claim 10, wherein the modification step comprises material removal of a portion of the contact surface so as to flatten the contact surface in the mounted state of the biasing element, preferably obtaining an essentially planar portion extending in an essentially radial direction in the mounted state of the biasing element.

12. The method according to claim 11, wherein the portion of the contact surface from which material is removed corresponds to a portion of the contact surface having an angular offset to a radial direction of the spark plug jacket and/or extending in the longitudinal direction in the mounted state of the biasing element.

13. The method according to claim 10, wherein the modification step comprises material removal of the portion by machining under stress or milling.

14. The method according to claim 10, wherein the modification step comprises material removal of the portion by plunge turning.

15. The method according to claim 14, wherein the material removal is provided by compression, preferably using an entire width of a cutting-edge.

16. The method according to claim 15, wherein a predefined compression force is applied, preferably continuously, said compression force preferably being monitored and/or controlled.

17. The method according to claim 10 for manufacturing a spark plug jacket.

* * * * *